United States Patent
Lee et al.

(10) Patent No.: US 9,200,170 B2
(45) Date of Patent: Dec. 1, 2015

(54) INK JET INK COMPRISING ENCAPSULATED PIGMENT DISPERSIONS WITH MINIMAL FREE POLYMER

(75) Inventors: Hee Hyun Lee, Wilmington, DE (US); Michael Joseph Otley, Hockessin, DE (US); Michael Stephen Wolfe, Wilmington, DE (US); Tristan Williams, Cary, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/118,558

(22) PCT Filed: Dec. 15, 2011

(86) PCT No.: PCT/US2011/065128
§ 371 (c)(1),
(2), (4) Date: Nov. 19, 2013

(87) PCT Pub. No.: WO2013/009343
PCT Pub. Date: Jan. 17, 2013

(65) Prior Publication Data
US 2014/0094559 A1    Apr. 3, 2014

Related U.S. Application Data

(60) Provisional application No. 61/507,756, filed on Jul. 14, 2011.

(51) Int. Cl.
| | |
|---|---|
| C09D 11/10 | (2014.01) |
| C09D 11/326 | (2014.01) |
| C09B 67/08 | (2006.01) |
| C09C 3/10 | (2006.01) |
| C09C 1/36 | (2006.01) |
| C09C 1/24 | (2006.01) |
| C09D 11/322 | (2014.01) |

(52) U.S. Cl.
CPC .......... *C09D 11/326* (2013.01); *C09B 67/0008* (2013.01); *C09B 67/0013* (2013.01); *C09C 1/24* (2013.01); *C09C 1/3676* (2013.01); *C09C 3/10* (2013.01); *C09D 11/322* (2013.01)

(58) Field of Classification Search
None
See application file for complete search history.

(56) References Cited

U.S. PATENT DOCUMENTS

| | | |
|---|---|---|
| 4,597,794 A | 7/1986 | Ohta et al. |
| 5,022,592 A | 6/1991 | Zakheim et al. |
| 5,026,427 A | 6/1991 | Mitchell et al. |
| 5,085,698 A | 2/1992 | Ma et al. |
| 5,231,131 A | 7/1993 | Chu et al. |
| 5,679,138 A | 10/1997 | Bishop |
| 5,891,231 A | 4/1999 | Gnerlich et al. |
| 5,976,232 A | 11/1999 | Gore et al. |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 7,612,124 B2 | 11/2009 | Polk et al. |
| 7,741,384 B2 | 6/2010 | Liu |
| 2002/0044185 A1 | 4/2002 | Koitabashi et al. |
| 2003/0089277 A1 | 5/2003 | Zakheim et al. |
| 2003/0195274 A1* | 10/2003 | Nakamura et al. ............ 523/160 |
| 2004/0201658 A1 | 10/2004 | Jackson et al. |
| 2005/0090599 A1 | 4/2005 | Spinelli |
| 2007/0227401 A1 | 10/2007 | Ganshow et al. |
| 2008/0026221 A1* | 1/2008 | Vincent et al. ............... 428/407 |
| 2008/0064786 A1 | 3/2008 | Tanaka et al. |
| 2013/0225754 A1* | 8/2013 | Wolfe et al. .................. 524/505 |
| 2013/0231439 A1* | 9/2013 | Wolfe et al. .................. 524/533 |

FOREIGN PATENT DOCUMENTS

| | | |
|---|---|---|
| EP | 0556649 A1 | 8/1993 |
| EP | 1258510 A1 | 11/2002 |

OTHER PUBLICATIONS

International Search Report for PCT/US2011/065128, dated May 4, 2012 by the EPO.

* cited by examiner

*Primary Examiner* — Vu A Nguyen
(74) *Attorney, Agent, or Firm* — Simon L. Xu

(57) ABSTRACT

The present disclosure provides an inkjet ink comprising an aqueous vehicle and an encapsulated pigment dispersion. A process for encapsulating pigment dispersions is provided where a pigment is dispersed with a polymeric dispersant in an aqueous solvent system. The free polymer dispersant in the pigment dispersion is limited to less than 0.12 grams per gram of pigment. This dispersed pigment is then encapsulated by adding acrylate monomers and optionally acrylic and vinyl monomers and polymerizing. In the encapsulated pigment dispersion the weight ratio of final free polymer to polymer found to the final encapsulated pigment is less than 0.9. The free polymer dispersant is measured by a centrifugation method and the final free polymer is measured by a density gradient centrifugation method. Such encapsulated pigment dispersions may be used in inkjet inks and are stable to heat, aging test conditions, and solvent challenges. Prints from these inks have better durability.

16 Claims, No Drawings

INK JET INK COMPRISING ENCAPSULATED PIGMENT DISPERSIONS WITH MINIMAL FREE POLYMER

CROSS-REFERENCE TO RELATED APPLICATION

This application claims priority under 35 U.S.C. §119 from U.S. Provisional Application Ser. No. 61/507,756, filed Jul. 14, 2011 which is incorporated by reference in its entirety.

BACKGROUND OF THE DISCLOSURE

The present disclosure pertains to aqueous inkjet inks which comprise an aqueous vehicle and an encapsulated pigment dispersion as the colorant. More particularly, the disclosure relates to a dispersion process where a dispersed pigment is prepared with the amount of polymeric dispersant that is not bound to the pigment minimized, then monomers are added to the dispersed pigment, and polymerization is initiated to obtain an encapsulated pigment which has minimal free polymer in the final encapsulated pigment dispersion.

Dispersion methods are commonly used to disperse particles. A variety of dispersion processes have been described for dispersing particles. For inkjet inks pigments are dispersed with polymeric dispersants. Recently, processes have been described where the polymeric dispersed pigments are subject to a process that results in encapsulated pigments.

In U.S. Pat. No. 6,262,152 describes preparing encapsulated pigments where the encapsulation is achieved by using polymeric dispersants which have reactive sites and adding monomers that have substituents that can react with the reactive sites of the polymeric dispersant. For instance, the dispersant has isocyanate reactive groups and an isocyanate is added to react with the polymeric dispersant.

U.S. Pat. No. 7,612,124 describes polymer-enclosed color-imparting particles that are enclosed by a friable polymer formed from a water-dispersible polymerizable material.

U.S. Pat. No. 7,741,384 describes an encapsulation process where both the pigment dispersion and the monomer dispersion are separately mixed utilizing a surfactant to independently stabilize the dispersion and the monomer.

US Patent Application Publication No. 200700227401 describes an encapsulation process where the monomer is stabilized via a miniemulsion which is stabilized by a hydrophobic organic compound.

US Patent Application Publication No. 20080064786 describes a water insoluble polymeric dispersant for the pigment and two crosslinking steps, the first occurring in a ketone/water solvent and crosslinks the core of the polymer followed by a second crosslinking for the shell of the polymer.

There have been efforts in the art directed at improving the stability of pigment dispersions. These efforts have included improvements in the processes used to make the dispersions, the development of new dispersants and the exploration of the interaction between dispersants and pigment particles, and between dispersants and the aqueous vehicle. While much of the effort has general application at improving dispersion stability, some of that effort has not found utility in particular applications. For example, the pigment dispersions used in inkjet printing applications have very unique and demanding requirements. It is critical that ink components comprising pigment dispersion remain stable, not only in storage but also over repeated jetting cycles. It is also desirable that the pigment dispersions offer good durability, good rub-fastness, wet-fastness and highlighter pen fastness. As the inkjet industry moves to page-wide array printing the requirements for repeating jetting cycles may be an order of magnitude higher than the traditional Small Office/Home Office market. These and other emerging needs require improved pigment dispersions.

A need exists for highly stable, higher-quality and different property inks for ink-jet applications. Although improvements in polymeric dispersants have significantly contributed to improved ink-jet inks, the current dispersants still do not provide inks with the requisite stability, durability, optical density and chromaneeded for inkjet applications. The present invention satisfies this need by providing an encapsulated pigment dispersion based on a pigment which is stabilized by a polymeric dispersant to which is added acrylate monomers and optionally acrylic or vinyl monomers, which are, in turn, polymerized. This results in an encapsulated pigment dispersion that has more stability, better jetting without compromise of color properties and more flexibility for ink formulation.

SUMMARY OF THE DISCLOSURE

The present disclosure relates to encapsulating pigments for use in inkjet inks which have low free polymer in the dispersion of the encapsulated pigment. The encapsulation is achieved by polymerizing monomers in the presence of polymerically dispersed pigments. After the dispersion of the pigment the free polymer in the initial pigment dispersion is less than 0.1 grams per gram of pigment as measured by a centrifugation method. Then acrylate, optional acrylic monomers and/or vinyl monomers are added and these monomers are polymerized to encapsulate the pigment. In the final encapsulated pigment dispersion where the weight ratio of free polymer to polymer bound to the pigment is less than 0.9 as measured by a density gradient centrifugation method.

Accordingly,

A method of making an encapsulated pigment dispersion comprising steps of a) dispersing a pigment using a polymeric dispersant in an aqueous vehicle wherein the polymeric dispersant not bound to the pigment is less than 0.12 grams per gram of pigment in the pigment dispersion and the polymer dispersant bound to the pigment is less than 0.33 grams per gram of pigment where the polymeric dispersant not bound to the pigment is measured by a centrifugation method;

b) adding at least one encapsulation monomer to the aqueous vehicle of step (a) to form a first dispersed pigment/encapsulation monomer/aqueous mixture and wherein the encapsulation monomer comprises acrylate monomers;

c) dispersing the encapsulation monomer/aqueous mixture using high shear mixing to form a second dispersed pigment/encapsulation monomer/aqueous mixture;

d) polymerizing the encapsulation monomer by adding a polymerization initiator to the second dispersed pigment/encapsulation monomer/aqueous mixture wherein for the final encapsulated pigment dispersion the weight ratio of final free polymer to bound polymer is less than 0.9 and where the final free polymer is measured by a density gradient centrifugation method.

The polymeric dispersants that can be used for dispersing the pigments are random or structured polymers commonly used for inkjet ink pigments and can be based acrylate/acrylic monomers or polyurethanes. The polymeric dispersant for dispersing the pigments can be neutralized prior to, during or after the start of the dispersion process.

Additional monomers may be added prior to the polymerization step. These additional monomers may include acrylic monomers, acrylate monomers with nonionic components, vinyl acetate, styrene and other monomers that contain polymerizable double bonds and di- or tri-acrylates.

In accordance with another embodiment, there is provided an aqueous pigmented inkjet ink comprising an aqueous encapsulated pigment dispersion as described above. The pigment inkjet ink has from 0.1 to 15 wt % pigment based on the total weight of the ink, a surface tension in the range of 20 dyne/cm to 70 dyne/cm at 25° C., and a viscosity of lower than 30 cP at 25° C.

In still another embodiment, there is provided an ink set comprising at least one cyan ink, at least one magenta ink and at least one yellow ink, wherein at least one of the inks is an aqueous encapsulated pigmented inkjet ink as set forth above and described in further detail below. This ink set is often described as a CMY ink set.

In still another embodiment, there is provided an ink set comprising at least one cyan ink, at least one magenta ink, at least one yellow ink, and at least one black ink wherein at least one of the inks is an aqueous encapsulated pigmented inkjet ink as set forth above and described in further detail below. This ink set is often described as a CMYK ink set.

Other ink sets may include additional colors, as long as at least one of the inks is an aqueous encapsulated pigmented inkjet ink as set forth above and described in further detail below.

In yet another embodiment there is provided a method for inkjet printing onto a substrate, comprising the steps of:
 (a) providing an inkjet printer that is responsive to digital data signals;
 (b) loading the printer with a substrate to be printed;
 (c) loading the printer with an ink as set forth above and described in further detail below, or an inkjet ink set as set forth above and described in further detail below; and
 (d) printing onto the substrate using the ink or inkjet ink set in response to the digital data signals.

These and other features and advantages of the present invention will be more readily understood by those of ordinary skill in the art from a reading of the following Detailed Description. One of skill can appreciate that certain features of the invention which are, for clarity, described above and below in the context of separate embodiments, may also be provided in combination in a single embodiment. Conversely, various features of the invention that are, for clarity described above and below as a a single embodiment, may also be provided separately or in an embodiment. In addition, references in the singular may also include the plural (for example, "a" and "an" may refer to one, or one or more) unless the context specifically states otherwise. Further, references to values stated in ranges include each and every value within that range.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferable range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of:" Similarly, the term "consisting essentially of" is intended to include examples encompassed by the term "consisting of:"

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "ionically stabilized dispersions", ("ISD") are polymerically stabilized dispersions where the stabilization is due to ionic stabilization with little or no steric stabilization.

As used herein, the term "dispersible particles" are those particles that can be dispersed with dispersants including polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "drop" means a drop of liquid that is normally obtained from a laboratory dropper at room temperature and is normally about 0.04 grams for aqueous systems.

As used herein, the term "ambient conditions" refers to surrounding conditions, which are often around one atmosphere of pressure, about 50% relative humidity, and about 25° C.

As used herein, the term "encapsulation" means to encase a pigment in a polymeric system where the polymeric system is a product of polymerizing monomers in the presence of a pigment which is dispersed with a polymeric dispersant.

As used herein, the term "crosslinking" means the chemical reaction between reactive groups on at least two different chemicals, where one of the chemicals is at least disubstituted.

As used herein, the term "emulsion" means a stable mixture of two or more immiscible liquids held in suspension by small percentages of substances called emulsifiers.

As used herein, the term "miniemulsion" means dispersions of relatively stable oil droplets with a size in the 50 to 500 nanometer region prepared by shearing a system containing an oil, water, and a surfactant.

As used herein, the term "nonionic" means an oligomer or polymer derived from ethylene oxide and/or propylene oxide where there are at least 4 of the ethylene oxide or propylene oxide groups.

As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "Gloss" means observation of reflected light from a printed surface, normally the printed substrate is glossy paper.

As used herein, the term "SDP" means self-dispersible" "self-dispersing" or "self-dispersed" pigments.

As used herein, the term "free polymeric dispersant", means the polymeric dispersant which is unbound to the pigment, and can be determined by centrifugation method.

As used herein, the term "bound polymer dispersant", means the polymeric dispersant which is bound to the pigment or associated with the pigment, and is the difference between the total polymeric dispersant and the free polymeric dispersant.

As used herein, the term "free polymer", means the polymer which is unbound to the pigment after the final encapsulated pigment step, and can be determined by the gradient density centrifugation method.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "ETEGMA//BZMA//MAA" means the block copolymer of ethoxytriethyleneglycol methacrylate, benzylmethacrylate and methacrylic acid.

As used herein, the term "NMP" means n-Methyl pyrrolidone.

As used herein, the term "THF" means tetrahydrofuran.

As used herein, the term "Tetraglyme" means Tetraethylene glycol dimethyl ether.

As used herein, the term "Vazo® 68" refers to a free radical source for polymerization; the product is obtained from DuPont, Wilmington Del.

As used herein, the term "Liponics EG-1" refers to a humectant obtained from Lipo Chemicals, Paterson, N.J.

As used herein, the term "PROXEL™ biocide" refers to a biocide obtained from Arch Chemicals, Norwalk, Conn.

As used herein, the term "Desmophen® 1200" refers to a slightly branched, hydroxyl-bearing polyester obtained from Bayer Material Science, Pittsburgh, Pa.

Unless otherwise noted, the above chemicals were obtained from Aldrich (Milwaukee, Wis.) or other similar suppliers of laboratory chemicals.

Encapsulation Description

There are at least four distinct steps to the method of making the encapsulated pigments with low final free polymer.

a) Disperse a pigment with a polymeric dispersant in an aqueous vehicle. After the dispersion step the polymeric dispersant is associated with the pigment or is dissolved or dispersed in the aqueous vehicle. The means of dispersing the pigment are chosen to minimize the free polymeric dispersant, or after the dispersion the pigment dispersion is purified to remove excess free polymeric dispersant. The amount of free polymer dispersant is less than 0.12 gram/gram of pigment as measured by the centrifugation method. The amount of polymer dispersant bound to the pigment is less than 0.33 grams per gram of pigment.

b) Add at least one acrylate monomer to the pigment dispersion from (a). Other optional monomers may be added which include acrylics and vinyl compounds.

c) Mix the acrylate with the dispersed pigment using high shear mixing to form a mixture of monomers and the dispersed pigment.

d) Polymerize the monomers by adding a polymerization initiator which results in a final encapsulated pigment where the weight ratio of free polymer to polymer bound to the pigment is less than 0.9. as measured by the density gradient centrifugation method.

The free polymeric dispersant of step (a) is determined by the centrifugation method. "Free polymer", that which is unbound to the pigment in the pigment dispersion, is determined from the gravimetric % solids of the supernatant of the sample, after the pigment is removed by centrifugation.

1. The pigment dispersion sample is diluted with deionized water to 5% pigment.
2. The diluted sample is centrifuged at 20,000 rpm for 2 hours.
3. The pigment-free supernatant is analyzed for % solids content The amount of bound polymeric dispersant is defined as the difference between the initial amount of polymeric dispersant and the free polymer dispersant from the centrifugation method.

The free polymer in the encapsulated pigment mixture is determined by a density gradient method:
1. Add 75/25 Glycerol water solution to each centrifuge tube (approx. ⅓ of tube volume, ~11-12 g)
2. Slowly add 10.0 grams of the 5% pigment dispersion to be tested. Add by letting the dispersion slowly drain down the side of the tube to layer the dispersion on the top of the glycerol solution.
3. Centrifuge two hours at 25 degrees C. and 50,000 RPM
4. Carefully withdraw top layer containing polymer using the high intensity light and a long glass pipette and place into a tared aluminum weigh dish.
5. Bake for 3 to 4 hours in 95 deg C. convection oven to remove water and then transfer to a 150 deg C. vac. oven until dry (overnight).

The free polymer is the amount of polymer found in the supernatant. The amount of bound polymer is defined as the difference between the sum of the initial amount of polymeric dispersant and added monomers and the free polymer from the density gradient centrifugation method.

The free polymer at step 1 is constrained to be less than 0.12 g of free polymer per gram of pigment. This may be achieved by the selection of the dispersion process or by purification of the pigment dispersion prior to adding the monomers of step (b). Non-limiting examples of dispersion methods that can result in lower free polymeric dispersants include initially using solvents during the dispersion process prior to adding the aqueous vehicle. A dispersion can be made in solvent, the solvent removed and the system converted to an aqueous one. Another similar method is to start with a solvent system and add a more polar solvent such as water during the dispersion process to significantly change the polarity of the dispersion media. Non-limiting examples of purification means are to ultrafilter the pigment dispersion to remove free polymer dispersant below the 0.12 gram limit of free polymeric dispersant. Alternatively the free polymer dispersant may be below 0.1 g of free polymer dispersant per gram of pigment.

The polymeric dispersant which is bound to the pigment is less than 0.33 grams per gram of pigment. The bound polymeric dispersant is the difference between the total mass of the polymeric dispersant and the free polymeric dispersant as measured by the centrifugation method. Alternatively, the polymeric dispersant which is bound to the pigment is less than 0.25 grams per gram of pigment.

The free polymer after the encapsulation step must be below a 0.9 weight ratio of free polymer to polymer associated with the pigment in the final encapsulated pigment as measured by the density gradient centrifugation method. While not wishing to be bound by theory it is believed that the free polymer is a combination of polymeric dispersant and monomers that were polymerized and are not associated with the pigment.

The bound polymer is that polymer which is associated with the pigment. It is a combination of the initial polymeric dispersant and the polymerized monomer. It is thought that the bound polymer both stabilizes the pigment and when the encapsulated pigment is used in an inkjet ink the bound polymer helps keep the pigment on or near the surface of the printed substrate when the pigment dispersion is used in an inkjet ink. As such the resulting print is much more durable than when the pigment has not been encapsulated in this manner.

The limitation of the weight ratio of 0.9 free polymer to bound polymer can lead to better properties of the encapsulated pigment and, in turn, an inkjet ink that has better performance. The better properties can include stability to high temperature testing, formulation latitude when the encapsulated pigments are used in subsequent uses. In the case where the subsequent use is in an inkjet ink better print performance is observed which includes larger volumes of ink successfully put through an inkjet printhead. Alternatively, the weight ratio of free polymer to bound polymer may be less than 0.75 and further less than 0.6.

Each of the components of the encapsulated pigment system will be described.

Pigments

Pigments suitable for use in the present invention are those generally well known in the art for aqueous inkjet inks. Representative commercial dry pigments are listed in U.S. Pat. No. 5,085,698. Dispersed dyes are also considered pigments as they are insoluble in the aqueous inks used herein.

A wide variety of organic and inorganic pigments, alone or in combination, may be selected to make the ink. The term "pigment" as used herein means an insoluble colorant which includes dispersed dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron, and in embodiments, the pigment particle size range from about 0.005 to about 5 micron, and in embodiments, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The dispersed pigment may be purified after the dispersion process by filtration, ultrafiltration or other processes used for purification of dispersed pigments.

Polymeric Dispersants

Polymeric dispersants are those typically used for dispersing pigments, especially when these pigments are used for inkjet inks. Examples of these dispersants include polyurethanes and acrylic/acrylate copolymers. The polymers may be random or structured. The polymeric dispersant has a number average molecular weight of 2000 to 9500 daltons. Optionally, the molecular weight is 2000 to 6000 daltons.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or any steric stabilization. These ionic polymeric dispersants were described in US Patent Application Publication No. 20050090599.

The polymeric dispersant for the pigment may be either a random or structured polymer. The polymer dispersant can be a copolymer of hydrophobic and hydrophilic monomers. The hydrophobic monomers are acrylates and the hydrophilic monomers are acrylics. Alternately, the polymeric dispersant may be a polyurethane.

Typical random polymeric dispersants have been described in U.S. Pat. No. 4,597,794.

The "structured polymer" can mean polymers having a block, branched, graft or star structure. Examples of structured polymers include AB or BAB block copolymers such as disclosed in U.S. Pat. No. 5,085,698; ABC block copolymers such as disclosed in EP Patent Specification No. 0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218. The ionically stabilized polymeric dispersants described above have little if any steric stabilization.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

The polyurethane polymeric dispersants are prepared from isocyanates compounds, isocyanate-reactive compounds and a isocyanate or isocyanate reactive compound that has an ionic substituent. This ionic substituent is present in the polyurethane dispersant to stabilize it in an aqueous solution. Often these polyurethane dispersants are prepared as a polyurethane prepolymer with excess isocyanate groups. Then a chain terminating isocyanate-reactive group is added to obtain polyurethane dispersant. The ionic content of the polyurethane can be as low as 10 and as high as 90 milliequivalents/gram when measured as an acid group or an amine group depending on the source of the ionic substituent. The ionic component is at least partially neutralized prior to its use as a dispersant. The molecular weight range of these polyurethanes is from 2000 to 9500 daltons.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as a test criterion for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared. This crosslinking step falls after Step (a) and before Step (b) in the method described above.

For crosslinking the polymeric dispersant is substituted with crosslinkable moieties which are selected from the group consisting of acetoacetoxy, acid, amine, epoxy, hydroxyl, blocked isocyanates and mixtures thereof. Then a crosslinking agent is added and the crosslinking of the polymeric dispersant occurs. The crosslinking agent is selected from a group consisting of acetoacetoxy, acid, amine, anhydride, epoxy, hydroxyl, isocyanates, blocked isocyanates and mixtures thereof. The crosslinking of the polymeric dispersant is done after the pigment is dispersed and before the encapsulation monomer is added. After the crosslinking step excess polymer can be removed by purification processes such as ultrafiltration.

Specific examples of crosslinking moiety/agent pairs are hydroxyl/isocyanate and acid/epoxy.

Monomers for Encapsulation

The monomers used for the encapsulation are acrylates and, optionally acrylics and other vinyl compounds. The acrylates are hydrophobic monomers and in general include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, ethoxytriethyleneglycol methacrylate, hydroxyethyl methacrylate, hydroxypropyl methacrylate, 2-ethoxyethyl methacrylate, hydroxyethyl acrylate, hydroxypropyl acrylate, di- and tri-methacrylates, and mixtures thereof.

Acrylic hydrophilic monomers can also be used as a monomer for the encapsulation. The amount of acrylic monomer is less than 20 weight percent of the acrylates. Hydrophilic monomers include, for example, methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

Acrylates with nonionic substituents may be included in the hydrophobic acrylate monomers. These nonionic components can be derived from ethylene oxide and propylene oxide and usually there are more than 3 of the ethylene oxide and propylene oxide groups. The total weight of these nonionic substituents is less than 20 weight percent based on the acrylates.

Other monomers may be used such as styrene, alpha-methyl styrene, substituted styrenes, N-alkyl acrylamides, N-alkyl methacrylamides, vinyl acetate, and vinyl butyrate and vinyl benzoate and mixtures thereof. The amount of these other vinyl group monomers can be used at less than 50 weight percent based on the acrylates.

Additional monomers used in the polymerization can include di(meth)acrylates and trimethacrylates.

The encapsulation monomers may contain mixtures of acrylates, acrylics, and vinyl monomers as described above.

Encapsulation Process

The encapsulation process occurs when the monomers are polymerized in the presence of the pigment which has been dispersed with polymeric dispersant. The encapsulated pigment has improved stability relative to a polymerically dispersed pigment that has not been encapsulated. When the encapsulated pigment is used in an inkjet ink the inks have better storage stability, improved performance in inkjet inks with aggressive solvent in the formulation, and the optical properties are comparable to the dispersed pigments that are not encapsulated. The durability of the prints from these encapsulated pigmented inks is excellent. These encapsulated pigments have utility in all inkjet printheads, including piezo and thermal printheads.

Prior to the encapsulation process, the monomers are mixed into an aqueous mixture which contains the polymerically dispersed pigment. The monomers may have a compatibility with the polymerically dispersed pigment such that they are associated with the polymerically dispersed pigment prior to the polymerization. The mixing methods can include high sheer mixing.

This aqueous mixture of the polymerically dispersed pigments, and monomer(s) is mixed using high shear mixing. Examples of equipment for the high shear mixing includes a ultrasonicator, media mill, a horizontal mini mill, an attritor, or by passing the mixture through a plurality of nozzles within a liquid jet interaction chamber at a liquid pressure of at least 5,000 psi.

Following this high shear mixing that produces a mixture of the dispersed pigment, and the monomers, the polymerization of the monomers is initiated by addition of appropriate initiators which include peroxides, azo compounds and redox initiators. The temperature of the polymerization is determined by the temperature required for the initiator and the properties of the monomers.

While not wishing to be bound by theory, the monomers apparently have an affinity for the polymerically dispersed pigment such that the monomers can be polymerized. These polymerized monomers in conjunction with the dispersed pigment produce the encapsulated pigment. The properties of the encapsulated pigment may lead to the conclusion that the polymer from the added monomer must be in solid mixture which surrounds the pigment. For instance, polymerically dispersed pigments can have the polymeric dispersant displaced by a strong solvent such as butyl cellosolve. When the encapsulated pigment is challenged with a strong solvent it is stable relative to the polymerically dispersed pigment which has not been encapsulated. It is expected that the polymer derived from the monomers added is an independent polymer in the solid mixture that surrounds the pigment. Furthermore, the added encapsulated monomers are not chemically reacted with either the dispersant polymer or the polyurethane solids of the polyurethane dispersion. The dispersant polymer, by design, has no reactive sites with which the acrylate monomers can copolymerize. Disubstituted monomers can be used with the acrylate monomers to produce polymers with some branching.

Another way to observe the encapsulated pigment is to study the density of the encapsulated pigment before and after the encapsulation. One way to determine the density is to test the encapsulated pigment in a glycerol, sucrose or similar chemical gradient. Glycerol and water are added into a centrifuge tube and the encapsulated pigment is added. After centrifugation the encapsulated pigment will be at a level which reflects its density. The encapsulated pigment has lower density than the polymerically dispersed pigment. In the density gradient centrifugation method the free polymer will be in the supernatant and the encapsulated pigment will be in the bottom of the centrifuge tube.

The product of this process is a stable, dispersed pigment. This stable pigment dispersion is one that has less than 10% particle size growth and no flocculation when the dispersion is stored at room temperature for at least a week. More rigorous testing that entail accelerated testing by heating samples for a week or more can also be used to determine the stability of the particle dispersions. The optimal particle dispersion stability would depend on the particle characteristics and/or final use. Another criterion for a stable dispersed particle is that it can be processed under the dispersing process conditions, not gel or have other adverse properties.

The encapsulated pigments of this invention demonstrate improved storage stability, improved stability when tested in a solvent challenge procedure. The inks derived from these encapsulated pigments perform better in extended jettability tests. The printed inks are more durable than those inks which contain pigments that are not encapsulated.

Amounts/Ratios of the Ingredients

For inkjet inks the mass ratio of pigment to polymeric dispersant ranges from 0.33 to 400. This ratio is based on the mass of the pigment and that of the polymeric dispersant added to the dispersion. For organic pigments the ratio is 0.33 to 12, optionally 0.5 to 10. For inorganic pigments the ratio is 3 to 400, optionally 5 to 200.

The ratio of encapsulation monomer to pigment for the encapsulating step is 0.1 to 10 based on the pigment and measured on a weight/weight basis. Thus, if there are 100 grams of pigment in a liter of aqueous dispersion, 10 to 1000 grams are added to the polymeric dispersion of the pigment prior to encapsulation. Optionally, the ratio of encapsulation monomer to pigment is 0.15 to 5 or alternatively 0.25 to 1.

There is a balance of properties between the polymeric dispersant used and the monomers used such that properties of the polymeric dispersant and pigment/dispersant [P/D] ratio may limit how much encapsulation monomer may be used. For instance, for the more hydrophobic encapsulation monomers the P/D may need to be higher.

In the case of organic pigments, the inkjet ink may contain up to approximately 30% of the encapsulated pigment, optionally 0.11 to 25%, and further from 0.25 to 15% pigment by weight based on the total ink weight of the ink. If an inorganic pigment is selected, the ink will tend to contain higher weight percentages of pigment than with comparable inks employing organic pigment, and the ink may be as high as 75% in some cases, since inorganic pigments generally have higher specific gravities than organic pigments. Examples of inorganic pigments include titanium dioxide, iron oxides, and the like.

Inkjet Ink Components

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented inkjet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl)ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from 30% water/70% diethylene glycol to 95% water/5% diethylene glycol. The preferred ratios are approximately 60% water/40% diethylene glycol to 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of 70% to 99.8%, and preferably 80% to 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from 1 to 15% by weight and more typically 2 to 10% by weight, based on the total weight of the ink. Surfactants may be used, typically in the amount of 0.01 to 5% and preferably 0.2 to 4%, based on the total weight of the ink.

Other Additives

Other additives, such as biocides, humectants, chelating agents and viscosity modifiers, may be added to the ink for conventional purposes. Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Other polymer additives to the ink, if used, can be soluble or dispersed polymer(s). They can be any suitable polymer, for example, soluble polymers may include linear homopolymers, copolymers, block polymers or natural polymers. They also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization. Useful classes of polymers include, for example, acrylics, styrene-acrylics, urethanes and alginates. These polymer additives are added at the time an ink is made, after any encapsulation is complete.

These polymer additives can be effective in improving gloss and other properties while not sacrificing optical density. Other properties that can be affected by the polymer additives include, for example, reliability for thermal inkjet printing and image durability.

Ink Properties

Drop velocity, separation length of the droplets, drop size and stream stability are greatly affected by the surface tension and the viscosity of the ink. Inkjet inks typically have a surface tension in the range of 20 dyne/cm to 70 dyne/cm at 25° C. Viscosity can be as high as 30 cP at 25° C., but is typically somewhat lower. The ink has physical properties that can be adjusted to the ejecting conditions and printhead design. The inks should have excellent storage stability for long periods so as not clog to a significant extent in an inkjet apparatus. Further, the ink should not corrode parts of the ink-jet printing device it comes in contact with, and it should be essentially odorless and non-toxic.

Although not restricted to any particular viscosity range or printhead, lower viscosity inks can be used, and may be preferred for certain applications. Thus the viscosity (at 25° C.) of the inks can be less than 7 cP, less than 5 cP, or even less than 3.5 cP.

The inkjet inks described herein may be jetted from any of the inkjet printheads, including drop-on-demand, piezo and thermal printheads. The printed substrates can include all types of paper, textiles, and hydrophobic surfaces.

Ink Sets

Ink sets suitable for use with the present disclosure comprise at least three primary color inks: a cyan ink, a magenta ink and a yellow ink (CMY). The ink set may optionally contain additional inks, and particularly a black ink (making a CMYK ink set). At least one of colors must have the pigment encapsulated by the process described above.

When the ink set contains a black ink, pigment is generally preferred for black from the standpoint of high optical density. A black pigment can be a carbon black pigment, and optionally a self-dispersed pigment black may be used. However, when the black is prepared by the presently disclosed process the black ink will be black pigment with a polymeric dispersant and, in turn, encapsulated by polymerizing monomers.

The ink set may further comprise a fixing solution. See, for example, U.S. Pat. Nos. 5,746,818, 6,450,632, US Patent Application Publication No. 20020044185, EP Patent Specification No. 1258510 and US Patent Application Publication No. 20040201658.

Examples

The following examples illustrate the various embodiments of the present disclosure without, however, being limited thereto. Tests listed here are those that are commonly used for testing pigment dispersions and inkjet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW characterization of the Polymeric Dispersants

Molecular weights of the polymers were determined by GPC using poly (methyl methacrylate) standards with tetrahydrofuran as the eluent. The molecular weight is routinely reported as number average molecular weight, Mn or optionally the weight average molecular weight Mw. The polymeric dispersants are not limited to Gaussian distribution of molecular weight, but may have other distributions such as bimodal distributions.

Free polymer dispersant, that which is unbound to the pigment in an ink or pigment dispersion, is determined from the gravimetric % solids of the supernatant of the sample, after the pigment is removed by centrifugation.

Centrifugation Method:
1. The pigment dispersion sample is diluted with deionized water to 5% pigment.
2. The diluted sample is centrifuged at 20,000 rpm for 2 hours.
3. The pigment-free supernatant is analyzed for % solids content (assumed to be free polymeric dispersant).
4. The amount of free polymeric dispersant in the sample is determined gravimetrically by drying the supernatant obtained from the centrifugation step weighing the solids left behind after weighing.
5. The bound polymeric dispersant is the difference between the total polymeric dispersant and the free polymeric dispersant.

Free polymer in the final encapsulated pigment dispersion, that which is unbound to the pigment in an ink or pigment dispersion, is determined by the density gradient centrifugation method:
1. Make up glycerol solution (75/25 solution) three parts glycerol to one part water by weight.
2. Add 75/25 glycerol water solution to each centrifuge tube (approx. ⅓ of tube volume, ~11-12 g)

3. Slowly add 10.0 grams of the 5% pigment dispersion to be tested. Add by letting the dispersion slowly drain down the side of the tube to layer on top of the glycerol solution.
4. Centrifuge two hours at 25 degrees C. and 50,000 RPM
5. Carefully withdraw top layer containing polymer using the high intensity light to find polymer and a long glass pipette and place into a tared aluminum weigh dish.
6. Bake for 3 to 4 hours in 95 deg C. convection oven to remove water and then transfer to a 150 deg C. vac. oven until dry (overnight).
7. Calculate amount of free polymer in the supernatant.
8. The bound polymer is the difference between the total polymer and the free polymer.

The inks were tested by printing on various substrates with HP printers. Plain paper, glossy paper and brochure paper were tested. The jettability of the inks over a long print cycle was done by printing from an HP45 printhead. The amount of ink from each drop was measured periodically and the test design was to eject up to 50 mLs of ink for each ink. The quality of this jettability was judged by the total number of mLs of ink jetted, the stability of the amount jetted and the variability of the amount jetted.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. These highlighter marks were tested by measuring the optical density in the region on the smear adjacent to the printed image. The optical density is corrected for a highlighter that is not drawn across the printed image. That is, after the highlighter is drawn across the printed marks the OD is measured in the yellow highlighted area adjacent to the printed marks. In this area will be the highlighter and the transferred pigment. The amount of optical density measured is an indication of how much of the printed image is smeared and a higher number demonstrates a worse result. This smear is reported in milliOD units.

Dispersant Polymer 1 Polyurethane 1 (DEA Terminated TMXDI/UH-50/DMPA)

To a dry, alkali- and acid-free, 2 liter flask equipped with an additional funnel, a condenser and a stirrer, under a nitrogen atmosphere was added Eternacoll® UH-50 (117.0 g), dimethylol propionic acid (87.0 g) and Sulfolane (220.0 g). The contents were heated to 115° C. and mixed under a nitrogen gas purge for 30 minutes. The temperature was then lowered to 60° C. and DBTDL (0.08 g) was added followed by TMXDI (238.0 g) via the addition funnel. The residual TMXDI in the additional funnel was rinsed into the flask with Sulfolane (15.0 g). The stirred reaction mass was allowed to exotherm. When exotherm began to slow, the temperature was maintained at 100° C. while monitoring the isocyanate content until it reached 1.06%. The temperature was lowered to 60° C. To the flask was added DEA (18.04 g) via the additional funnel followed by rinsing the residual BMEA in additional funnel into the flask with Sulfolane (5.0 g). The mixture was maintained at 60° C. for 90 minutes. A solution of 45% KOH in water (56.56 g) and additional de-ionized water (776.87 g) were added over a period of 5 minutes to give a 70% neutralized polyurethane resin in water. This was allowed to stir and cool to room temperature to provide a polyurethane dispersion with 27.49% of solids and a measured acid number of 79.03 mg KOH/gram polymer.

Dispersant Polymer 2 (Structured Polymer, Triblock) ETEGMA//BZMA//MAA 3.6//13.5//10.8

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added to the flask. Initiator, 1,1-bis(trimethylsiloxy)-2-methyl propene, 20.46 gm (0.0882 moles) was injected into the flask. Feed I [tetrabutyl ammonium m-chlorobenzoate, 0.33 ml of a 1.0 M solution in acetonitrile and THF, 16.92 gm] was started and added over 185 minutes. Feed II [trimethylsilyl methacrylate, 152.00 gm (0.962 moles)] was started at 0.0 minutes and added to the flask over 45 minutes. One hundred and eighty minutes after Feed II was completed (over 99% of the monomers had reacted) Feed III [benzyl methacrylate, 211.63 gm (1.20 moles) was started and added over 30 minutes. Forty minutes after Feed III was completed (over 99% of the monomers had reacted) Feed IV methacrylate, 78.9 gm (0.321 moles) was started and added over 30 minutes.

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of ETEGMA//BZMA//MAA 3.6//13.5//10.8. It has a molecular weight of Mn=4,200, acid value 162.

Pigment Dispersions

The pigmented dispersions were prepared using a two-step process involving a first mixing step followed by a second grinding step. The first step comprises mixing of all the ingredients, that is, pigment, dispersants, liquid carriers, neutralizing agent, and any optional additives to provide a blended "premix". Typically all liquid ingredients were added first, followed by the neutralizing agent, then the dispersants, and lastly the pigment. Mixing was done in a stirred mixing vessel, and a high-speed disperser (HSD) was used for the mixing step. A Cowels type blade was attached to the HSD and was operated at from 500 rpm to 4000 rpm, which provided optimal shear to achieve the desired mixing. Adequate mixing was usually achieved after mixing under the conditions described above for a period of from 15 to 120 minutes to obtain the premix mixture.

The second step was grinding of the premix to produce a pigmented dispersion. A lab-scale Eiger Minimill (Model M250, VSE EXP) manufactured by Eiger Machinery Inc., Chicago, Ill. was employed. Grinding was accomplished by charging 820 grams of 0.5 YTZ® zirconia media to the mill. The mill disk was operated at a speed between 2000 rpm and 4000 rpm, and typically between 3000 rpm and 3500 rpm. The dispersion was processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention were subjected to a total of 4 hours of milling.

For black dispersions, an alternate milling process using a Microfluidizer was used. Microfluidization is a non-media milling process in which milling is done by pigment impingement through nozzles under high pressures. Typically, pigment dispersions were processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Alternatively, the pigment dispersion for step (a) was prepared using a solvent milling process, in which 6 parts of an un-neutralized dispersant were combined with 16 parts of a pigment in 50 parts of water and 27.5 parts of a solvent (methyl ethyl ketone), and sufficient KOH to neutralize the dispersant to a degree of 90%. This premix was dispersed in a High Speed Disperser (HSD) at 2000 rpm for 2 hours. The resulting premix was sufficiently milled to achieve an acceptable particle size. The milled dispersion was then distilled at 67° C. under vacuum to remove the solvent.

Preparation of Pigmented Dispersion K1

The following procedure was used to prepare a black pigmented dispersion using Nipex 180 and Dispersant 1. Using an microfluidizer, a premix was prepared at typically 20-30% pigment loading and the targeted dispersant level was selected at a pigment/dispersant (P/D) ratio of 2.0. A P/D of 2.0 corresponds to a 40% dispersant level on pigment. A co-dispersant, Surfynol 104 in Dowanol DPM at a P/D=100 was added to the total dispersion formulation to facilitate wetting of pigment and dissolution of dispersant in the premix stage for ease of grinding during milling stage. Dispersant 1 was pre-neutralized with KOH to facilitate solubility and dissolution into water. An additional 6.91 g of a 45% KOH solution in water was added. During the premix stage and milling stage, de-ionized water (1200 g) was added to adjust viscosity and control temperature. After completion of the milling stage, the remaining letdown of de-ionized water (450.0 g) was added and thoroughly mixed. The final pigment dispersion contains 23.15% of solids.

The pigment dispersion was purified using an ultrafiltration process to remove co-solvent(s) and excess dispersant, and filter out other impurities that may be present. After completion, the pigment level in the dispersion was reduced to 10 to 15%. A single black dispersion was prepared using the Polyurethane Dispersant 1.

| Pigmented Dispersion | Pigment | Pigment/ Dispersant | Polyurethane Dispersant No. | Particle Size D50 (nm) | D95 (nm) |
|---|---|---|---|---|---|
| K1 | Nipex 180 | 2 | 1 | 107 | 185 |

Preparation of Cross-linked Pigment Dispersion XL-K1

In the cross-linking step, Denacol® 321 was mixed with one of the pigmented Dispersion K1, and heated at temperatures between 60° C. and 80° C. with efficient stirring for 6-8 hours. After the cross-linking reaction was completed, the pH was adjusted to at least about 8.0 if needed. The composition of the cross-linked Pigment Dispersion XL-K1 is summarized below.

| Cross-linked Dispersion | Pigmented Dispersion | Cross-linkable Moiety | Cross-linking Compound |
|---|---|---|---|
| XL-K1 | K1 | COOH, OH | Denacol® 321 |

EXAMPLES

Encapsulation Example 1

Nipex 180 (black) dispersion was prepared with Pigment Dispersion K1 described above so that pigment to dispersant ratio was 4.1. Encapsulation Monomer mixture was prepared by mixing 6.2 gram ETEGMA, 0.69 gram BZMA, and 0.10 gram of Ethoxylated bisphenol A dimethacrylate. 29.98 gram of water was added in 172.32 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 102 nm and D95 175 nm.

The sonicated mixture was transferred to 250 ml reactor equipped with an agitator and a condenser. The reactor was then heated to 82° C. 9.76 gram of 2.5% water soluble initiator, Vazo® 68 was then charged for an hour and polymerized at 82° C. for additional two hours. The particle size data after polymerization are D50 163 nm and D95 448 nm.

Encapsulation Example 2

Nipex 180 (black) dispersion was prepared with Pigment Dispersion K1 described above so that pigment to dispersant ratio was 4.1. Encapsulation Monomer mixture was prepared by mixing 4.69 gram ETEGMA, 0.52 gram BZMA, and 0.08 gram of Ethoxylated bisphenol A dimethacrylate. 30.22 gram of water was added in 173.7 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 102 nm and D95 175 nm.

The sonicated mixture was transferred to 250 ml reactor equipped with an agitator and a condenser. The reactor was then heated to 82° C. 9.83 gram of 2.5% water soluble initiator, Vazo® 68 was then charged for an hour and polymerized at 82° C. for additional two hours. The particle size data after polymerization are D50 108 nm and D95 176 nm.

Encapsulation Example 3

Nipex 180 (black) dispersion was prepared by MEK milling method described above using acrylic dispersant polymer 1 ETEGMA//BzMA//MAA 3.6//13.6//10.8 so that pigment to dispersant ratio was 3.6. Encapsulation Monomer mixture was prepared by mixing 5.5 gram ETEGMA, 0.62 gram BZMA, and 0.10 gram of Ethoxylated bisphenol A dimethacrylate. 73.42 gram of water was added in 120.1 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 101 nm and D95 170 nm.

The sonicated mixture was transferred to 250 ml reactor equipped with an agitator and a condenser. The reactor was then heated to 82° C. 9.81 gram of 2.5% water soluble initiator, Vazo® 68 was then charged for an hour and polymerized at 82° C. for additional two hours. The particle size data after polymerization are D50 125 nm and D95 219 nm.

Encapsulation Example 4

Nipex 180 (black) dispersion was prepared by MEK milling method described above using acrylic dispersant polymer 1 ETEGMA//BzMA//MAA 3.6//13.6//10.8 so that pigment to dispersant ratio was 3.6. Encapsulation Monomer mixture was prepared by mixing 4.18 gram ETEGMA, 0.46 gram BZMA, and 0.07 gram of Ethoxylated bisphenol A dimethacrylate. 73.94 gram of water was added in 121 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 98 nm and D95 151 nm.

The sonicated mixture was transferred to 250 ml reactor equipped with an agitator and a condenser. The reactor was then heated to 82° C. 9.49 gram of 2.5% water soluble initiator, Vazo® 68 was then charged for an hour and polymerized at 82° C. for additional two hours. The particle size data after polymerization are D50 99 nm and D95 177 nm.

Encapsulation Example 5

Nipex 180 (black) dispersion was prepared with Pigment Dispersion K1 described above so that pigment to dispersant ratio was 3.8. Encapsulation Monomer mixture was prepared by mixing 5.93 gram ETEGMA, 0.66 gram BZMA, and 0.10 gram of Ethoxylated bisphenol A dimethacrylate. 39.54 gram of water was added in 163 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 98 nm and D95 160 nm. The sonicated mixture was transferred to 250 ml reactor equipped with an agitator and a condenser. The reactor was then heated to 82° C. 10.22 gram of 2.5% water soluble initiator, Vazo® 68 was then charged for an hour and polymerized at 82° C. for additional two hours. The particle size data after polymerization are D50 109 nm and D95 188 nm.

Encapsulation Example 6

Nipex 180 (black) dispersion was prepared with Pigment Dispersion K1 described above) so that pigment to dispersant ratio was 3.8. Encapsulation Monomer mixture was prepared by mixing 4.48 gram ETEGMA, 0.50 gram BZMA, and 0.07 gram of Ethoxylated bisphenol A dimethacrylate. 39.86 gram of water was added in 164.24 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 100 nm and D95 171 nm.

The sonicated mixture was transferred to 250 ml reactor equipped with an agitator and a condenser. The reactor was then heated to 82° C. 9.14 gram of 2.5% water soluble initiator, Vazo® 68 was then charged for an hour and polymerized at 82° C. for additional two hours. The particle size data after polymerization are D50 103 nm and D95 165 nm.

Encapsulation Example 7

Nipex 180 (black) dispersion was prepared by two step milling method described above using acrylic dispersant polymer 1 ETEGMA//BzMA//MAA 3.6//13.6//10.8 followed by UF process so that pigment to dispersant ratio was 3.1. Encapsulation Monomer mixture was prepared by mixing 6.26 gram ETEGMA, 0.7 gram BZMA, and 0.10 gram of Ethoxylated bisphenol A dimethacrylate. 20.87 gram of water was added in 181.47 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 108 nm and D95 189 nm.

The sonicated mixture was transferred to 250 ml reactor equipped with an agitator and a condenser. The reactor was then heated to 82° C. 9.02 gram of 2.5% water soluble initiator, Vazo® 68 was then charged for an hour and polymerized at 82° C. for additional two hours. The particle size data after polymerization are D50 125 nm and D95 241 nm.

Encapsulation Example 8

Nipex 180 (black) dispersion was prepared by the two step milling method described above using acrylic dispersant polymer 1 ETEGMA//BzMA//MAA 3.6//13.6//10.8 followed by UF process so that pigment to dispersant ratio was 3.1. Encapsulation Monomer mixture was prepared by mixing 4.73 gram ETEGMA, 0.53 gram BZMA, and 0.08 gram of Ethoxylated bisphenol A dimethacrylate. 21.04 gram of water was added in 182.94 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 97 nm and D95 175 nm.

The sonicated mixture was transferred to 250 ml reactor equipped with an agitator and a condenser. The reactor was then heated to 82° C. 9.34 gram of 2.5% water soluble initiator, Vazo® 68 was then charged for an hour and polymerized at 82° C. for additional two hours. The particle size data after polymerization are D50 98 nm and D95 165 nm.

Encapsulation Example 9

Nipex 180 (black) dispersion was prepared by the two step milling method described above using acrylic dispersant polymer 1 ETEGMA//BzMA//MAA 3.6//13.6//10.8 followed by UF process so that pigment to dispersant ratio was 2.6. Encapsulation Monomer mixture was prepared by mixing 4.62 gram ETEGMA, 0.51 gram BZMA, and 0.08 gram of Ethoxylated bisphenol A dimethacrylate. 35.91 gram of water was added in 168.22 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 111 nm and D95 167 nm.

The sonicated mixture was transferred to 250 ml reactor equipped with an agitator and a condenser. The reactor was then heated to 82° C. 9.21 gram of 2.5% water soluble initiator, Vazo® 68 was then charged for an hour and polymerized at 82° C. for additional two hours. The particle size data after polymerization are D50 108 nm and D95 178 nm.

Encapsulation Example 10

E-02 (Magenta) dispersion was prepared by MEK milling method described above using acrylic dispersant polymer 1 ETEGMA//BzMA//MAA 3.6//13.6//10.8 so that pigment to dispersant ratio was 4.0. Encapsulation Monomer mixture was prepared by mixing 3.86 gram 2-(2-Ethoxyethoxy) Ethyl Acrylate, 1.65 gram Hexyl Methacrylate, and 0.08 gram of Ethoxylated bisphenol A dimethacrylate. The monomer mixture was added in 184.87 gram of the magenta dispersion by 10 min magnetic stir. This mixture of pigment dispersion and encapsulation monomer mixture was also sonicated for 30 min (2 sec on, 4 sec off) in ice bath with 30% of full power. The particle size data after sonication are D50 89 nm and D95 173 nm.

The sonicated mixture was transferred to 250 ml reactor equipped with an agitator and a condenser. The reactor was then heated to 82° C. 9.45 gram of 2.5% water soluble initiator, Vazo® 68 was then charged for an hour and polymerized at 82° C. for additional two hours. The particle size data after polymerization are D50 104 nm and D95 203 nm.

Encapsulation Example 11

Nipex 180 (black) dispersion was prepared by process described above in Example 1 using IPDI/T650/DMPA/ BMEA so that pigment to dispersant ratio was 4.1. Encapsulation Monomer mixture was prepared by mixing 10.15 gram ETEGMA, 1.13 gram BZMA, 0.47 gram Stearyl MA and 0.17 gram of Ethoxylated bisphenol A dimethacrylate and the encapsulation monomer mixture was added in 159.65 gram of the black dispersion, and magnetic stirred for 10 min. This mixture of pigment dispersion and encapsulation monomer mixture was also sonicated for 30 min (2 sec on, 4 sec off) in ice bath with 30% of full power.

The microfluidized mixture was transferred to 250 ml reactor equipped with an agitator and a condenser. The reactor was then heated to 82° C. 8.42 gram of 2.5% water soluble initiator, Vazo® 68 was then charged for an hour and polymerized at 82° C. for additional two hours. The particle size data after polymerization are D50 171 nm and D95 310 nm.

Encapsulation Example 12

Nipex 180 (black) dispersion was prepared by the two step milling method described above using KOH neutralized acrylic dispersant polymer 1 ETEGMA//BzMA//MAA 3.6//13.6//10.8 followed by UF process so that pigment to dispersant ratio was 2.82. The pigment dispersion was crosslinked by adding Denacol® 321. The Denacol was 0.40 equivalent weight based on the acid number of the dispersant as described. After crosslinking of the polymeric dispersant the dispersion was purified by ultrafiltration.

Encapsulation Monomer mixture was prepared by mixing 3.25 gram 2-(2-Ethoxyethoxy) Ethyl Acrylate, 1.39 gram Hexyl MA, and 0.07 gram of Ethoxylated bisphenol A dimethacrylate. The encapsulation monomer mixture was added to the black dispersion and magnetic stirred for 10 min. This mixture of pigment dispersion and encapsulation monomer mixture was also sonicated for 30 min (2 sec on, 4 sec off) in ice bath with 30% of full power. The particle size data after sonication are D50 107 nm and D95 165 nm.

The sonicated mixture was transferred to 250 ml reactor equipped with an agitator and a condenser. The reactor was then heated to 82° C. 6.34 gram of 2.5% water soluble initiator Vazo® 68 was then charged for an hour and polymerized at 82° C. for additional two hours. The particle size data after polymerization are D50 102 nm and D95 170 nm.

Comparable Encapsulation Example 1

Nipex 180 (black) dispersion was prepared by two step milling method described above using acrylic dispersant polymer 1 ETEGMA//BzMA//MAA 3.6//13.6//10.8 so that pigment to dispersant ratio was 3.7. Encapsulation Monomer mixture was prepared by mixing 3.54 gram ETEGMA, 0.89 gram BZMA, and 0.18 gram of Ethyleneglycol dimethacrylate. 22.88 gram water dispersible preformed PU (19.31% solid, Preformed PU 2 in IJ302) was mixed with 53 gram of water and mixed with the monomer mixture by 10 min magnetic stir and also 6 min sonication (2 sec on, 4 sec off) in ice bath with 30% of full power. The mixture was added in 119.36 gram of the black dispersion and magnetic stirred for 10 min. This mixture of pigment dispersion and encapsulation monomer mixture was also sonicated for 30 min (2 sec on, 4 sec off) in ice bath with 30% of full power. The particle size data after sonication are D50 101 nm and D95 163 nm.

The sonicated mixture was transferred to 250 ml reactor equipped with an agitator and a condenser. The reactor was then heated to 82° C. 9.86 gram of 2.5% water soluble initiator, Vazo® 68 was then charged for an hour and polymerized at 82° C. for additional two hours. The particle size data after polymerization are D50 99 nm and D95 168 nm.

Comparable Encapsulation Example 2

Nipex 180 (black) dispersion was prepared by two step milling method described above using acrylic dispersant polymer 1 ETEGMA//BzMA//MAA 3.6//13.6//10.8 so that pigment to dispersant ratio was 2.3. Encapsulation Monomer mixture was prepared by mixing 9.26 gram ETEGMA, 1.05 gram BZMA, and 0.16 gram of Ethoxylated bisphenol A dimethacrylate. 61.7 gram of water was added in 137.6 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 101 nm and D95 159 nm.

The sonicated mixture was transferred to 250 ml reactor equipped with an agitator and a condenser. The reactor was then heated to 82° C. 9.67 gram of 2.5% water soluble initiator, Vazo® 68 was then charged for an hour and polymerized at 82° C. for additional two hours. The particle size data after polymerization are D50 93 nm and D95 169 nm.

Comparable Encapsulation Example 3

Nipex 180 (black) dispersion was prepared by MEK milling method described above using acrylic dispersant polymer 1 ETEGMA//BzMA//MAA 3.6//13.6//10.8 so that pigment to dispersant ratio was 2.0. Most of free dispersant remained in the MEK milled dispersion was removed by centrifuging in water followed by discarding supernatant solution. Centrifuged pigment dispersion was redispersed in water by sonication and resulting pigment to dispersant ratio was 2.83. Encapsulation Monomer mixture was prepared by mixing 6.91 gram ETEGMA, 0.56 gram Hexyl MA, and 0.11 gram of Ethoxylated bisphenol A dimethacrylate. 56.06 gram of water was added in 107.94 gram of the black dispersion, and the encapsulation monomer mixture was added to the mixture and magnetic stirred for 10 min. This mixture of pigment dispersion and encapsulation monomer mixture was also sonicated for 30 min (2 sec on, 4 sec off) in ice bath with 30% of full power. The particle size data after sonication are D50 106 nm and D95 185 nm.

The sonicated mixture was transferred to 250 ml reactor equipped with an agitator and a condenser. The reactor was then heated to 82° C. 6.03 gram of 2.5% water soluble initiator, Vazo® 68 was then charged for an hour and polymerized at 82° C. for additional two hours. The particle size data after polymerization are D50 106 nm and D95 189 nm.

For examples 1-11 and Comparative Examples 1-3 properties are listed in Table 1 and 2. For the dispersed pigment the free polymer dispersant is shown in table 1 as FP/P and was measured by the centrifugation method. For Example 3 FP/P analysis was done by both the centrifugation method and Glycerol density column method showed the same values for the base dispersion used in Exp. 3. (centrifugation method: FP/P 3.18, BP/P 21.82; density gradient centrifugation method: FP/P 2.7, BP/P 22.3)

TABLE 1

Dispersed Pigment and Monomers

| | Step (a) Dispersed Pigment | | Mass ratios for polymerization | |
|---|---|---|---|---|
| | FPD/P | BP/P | P/D | P:D:M |
| Exp 1 | 0.02 | 0.23 | 4.00 | 200:49:67.7 |
| Exp 2 | 0.02 | 0.23 | 4.00 | 200:49:50.8 |
| Exp 3 | 0.03 | 0.22 | 4.00 | 200:55.5:67.7 |
| Exp 4 | 0.03 | 0.22 | 4.00 | 200:55.5:50.8 |
| Exp 5 | 0.05 | 0.21 | 3.85 | 200:52.4:67.7 |
| Exp 6 | 0.05 | 0.21 | 3.85 | 200:52.4:50.8 |
| Exp 7 | 0.08 | 0.24 | 3.13 | 200:64.6:67.7 |
| Exp 8 | 0.08 | 0.24 | 3.13 | 200:64.6:50.8 |
| Exp 9 | 0.1 | 0.30 | 2.50 | 200:76.1:50.8 |
| Exp 10 | 0.08 | 0.17 | 4.00 | 200:50:50.8 |
| Exp 11 | 0.05 | 0.19 | 4.1 | 200:48.8:147.7 |
| Exp 12 | 0.06 | 0.30 | 2.73 | 200:73.2:50.8 |
| Comp 1 | 0.15 | 0.1 | 4.00 | 200:54.1:52 |
| Comp 2 | 0.26 | 0.15 | 2.44 | 200:88:101.5 |
| Comp 3 | <0.05 | 0.35 | 2.83 | 200:70.7:81.2 |

FPD/P free polymer dispersant as a wt fraction of pigment
BP/P bound polymer as wt fraction of pigment
P/D Pigment/dispersant Monomer composition:

Examples 1-9 and Comparative 2; 90:10:1.5 weight ratio of ethyl triethyleneglycol methacrylate:benzyl methacrylate: ethoxylated bisphenol A dinnethacrylate Example 10 and 12: 70:30:1.5 2-(2-Ethoxyethoxy) Ethyl Acrylate: hexyl methacrylate: ethoxylated bisphenol A dinnethacrylate Example 11; 90:10:4:1.5 weight ratio of ethyl triethyleneglycol methacrylate:benzyl methacrylate:Stearyl methacrylate:ethoxylated bisphenol A dimethacrylate.

Comparative Example 1: 40:10:2 weight ratio of ethyl triethyleneglycol methacrylate:benzyl methacrylate:ethoxylated bisphenol A dimethacrylate Comparative Example 3: 91:7.4:1.5 weight ratio of ethyl triethyleneglycol methacrylate:hexyl methacrylate: ethoxylated bisphenol A dimethacrylate For the final encapsulated pigments the free polymer is shown in the column labeled FP/P and the free polymer to bound polymer in column labeled FP/BP in Table 2.

TABLE 2

Encapsulated Pigment

| | P/P' | FP/P | BP/P | FP/BP |
|---|---|---|---|---|
| Exp 1 | 1.7 | 0.03 | 0.55 | 0.05 |
| Exp 2 | 2 | 0.11 | 0.39 | 0.28 |
| Exp 3 | 1.6 | 0.07 | 0.54 | 0.13 |
| Exp 4 | 1.9 | 0.09 | 0.44 | 0.2 |
| Exp 5 | 1.7 | 0.11 | 0.49 | 0.22 |
| Exp 6 | 1.9 | 0.21 | 0.3 | 0.7 |
| Exp 7 | 1.5 | 0.23 | 0.43 | 0.53 |
| Exp 8 | 1.9 | 0.14 | 0.4 | 0.35 |
| Exp 9 | 1.6 | 0.29 | 0.34 | 0.85 |
| Exp 10 | 2 | 0.05 | 0.45 | 0.11 |
| Exp 11 | 1.1 | 0.12 | 0.8 | 0.15 |
| Exp 12 | 1.6 | 0.21 | 0.41 | 0.51 |
| Comp 1 | 1.4 | 0.42 | 0.3 | 1.4 |
| Comp 2 | 1.1 | 0.38 | 0.39 | 0.97 |
| Comp 3 | 1.32 | 0.42 | 0.33 | 1.27 |

P/P' Pigment/total polymer as a ratio
FP/P free polymer as wt fraction of pigment
BP/P bound polymer as wt fraction of pigment
FP/BP Free polymer/Bound Polymer as wt/wt For selected examples the D50 and D95 were measured before and after polymerization and those results are listed in Table 3.

The same selected examples were formulated into inkjet formulations and tested by ageing the inks at 70° C. for 7 days and retesting the particle size.

TABLE 3

Particle Size: Before/After Polymerization and Ink Formulation

| | D50 (Before polymerization) | D95 (Before polymerization) | D50 (After polymerization) | D95 (After polymerization) | D50 (After polymerization and formulated in ink) | D95 (After polymerization and formulated in ink) | D50 (Ink aged for 7 days at 70oC oven) | D95 (Ink aged for 7 days at 70oC oven) | Oven Stability-Particle size change |
|---|---|---|---|---|---|---|---|---|---|
| Example 6 | 100 | 171 | 103 | 165 | 117 | 181 | 111 | 201 | D50-5% D95 11% |
| Example 8 | 97 | 175 | 98 | 165 | 105 | 177 | 110 | 178 | D50 5% D95 1% |
| Example 10 | 89 | 173 | 104 | 203 | 106 | 214 | 99 | 212 | D50-7% D95-1% |

TABLE 3-continued

Particle Size: Before/After Polymerization and Ink Formulation

| | D50 (Before polymer- ization) | D95 (Before polymer- ization) | D50 (After polymer- ization) | D95 (After polymer- ization) | D50 (After polymer- ization and formulated in ink) | D95 (After polymer- ization and formulated in ink) | D50 (Ink aged for 7 days at 70oC oven) | D95 (Ink aged for 7 days at 70oC oven) | Oven Stability- Particle size change |
|---|---|---|---|---|---|---|---|---|---|
| Compa- rable Example 2 | 101 | 159 | 93 | 169 | 113 | 175 | 113 | 190 | D50 0% D95 9% |

The Inventive inks show good particle size stability which is a measure of ink stability.

The selected inks were printed and performance parameters evaluated.

TABLE 4

Jetting, Print Properties, Ink Properties

| | Jetting[1] | Durability (Brochure paper) mOD | OD (Brochure paper) | Durability (Epson Photo Glossy) | OD (Epson Photo Glossy) | Ink Conductivity | Ink Viscosity (cP) |
|---|---|---|---|---|---|---|---|
| Example 6 | 0<br>1 (10 p)<br>4 (20 p)<br>8 (30 p) | 15 (1x)<br>90 (2x) | 1.88 | 0 (1x)<br>0 (2x) | 2.19 | 0.846 | 4.86 |
| Example 8 | 0<br>0 (10 p)<br>0 (20 p)<br>0 (30 p) | 105 (1x)<br>275 (2x) | 1.8 | 20 (1x)<br>40 (2x) | 2.04 | 1.622 | 4.41 |
| Example 10 | 0<br>1 (10 p)<br>3 (20 p)<br>6 (30 p) | 0 (1x)<br>60 (2x) | 1.33 | 0 (1x)<br>55 (2x) | 1.6 | 1.513 | 3.63 |
| Comparable Example 2 | 0<br>1 (10 p)<br>1 (20 p)<br>1 (30 p) | 0 (1x),<br>40 (2x) | 1.87 | 10 (1x)<br>15 (2x) | 2.2 | 1.74 | 6 |

The inventive inks performed well in the jettability tests, Durability on two different papers and the OD on the two papers were excellent.

What is claimed is:

1. An inkjet ink comprising an aqueous ink jet vehicle and an aqueous pigment dispersion, wherein said aqueous pigment dispersion is an encapsulated pigment dispersion which is prepared by the steps of:
    a) dispersing a pigment using a polymeric dispersant in an aqueous vehicle wherein the polymeric dispersant not bound to the pigment is less than 0.12 grams per gram of pigment in the pigment dispersion, and the polymer dispersant bound to the pigment is less than 0.33 grams per gram of pigment, where the polymeric dispersant not bound to the pigment is measured by a centrifugation method and is not removed from said pigment dispersion before said pigment dispersion is formulated into said ink;
    b) adding at least one encapsulation monomer to the aqueous vehicle of step (a) to form a first dispersed pigment/encapsulation monomer/aqueous mixture and wherein the encapsulation monomer comprises acrylate monomers;
    c) dispersing the encapsulation monomer/aqueous mixture using high shear mixing to form a second dispersed pigment/encapsulation monomer/aqueous mixture; and
    d) polymerizing the encapsulation monomer by adding a polymerization initiator to the second dispersed pigment/encapsulation monomer/ aqueous mixture, wherein for the final encapsulated pigment dispersion the weight ratio of final free polymer to bound polymer is less than 0.9 and the final free polymer is measured by a density gradient centrifugation method; and
    wherein said polymeric dispersant is crosslinked after the pigment is dispersed and before the encapsulation monomer is added.

2. The inkjet ink of claim 1, wherein the weight ratio of free polymer to polymer bound in the final encapsulated pigment is less than 0.75 as measured by the density gradient centrifugation method.

3. The inkjet ink of claim 1, wherein the weight ratio of free polymer to polymer bound in the final encapsulated pigment is less than 0.60 as measured by the density gradient centrifugation method.

4. The inkjet ink of claim 1, wherein the polymeric dispersant not bound to the pigment is less than 0.1 grams per gram of pigment in the pigment dispersion where the polymeric dispersant is measured by a centrifugation method; and the weight ratio of free polymer to polymer bound to the final encapsulated pigment is less than 0.6 as measured by the density gradient centrifugation method.

5. The inkjet ink of claim 1, wherein the weight ratio of encapsulation monomer to pigment is from 0.1 to 10.

6. The inkjet ink of claim 1, wherein the weight ratio of encapsulation monomer to pigment is from 0.15 to 5.

7. The inkjet ink of claim 1, wherein the weight ratio of encapsulation monomer to pigment is from 0.25 to 1.

8. The inkjet ink of claim 1, wherein the final free polymer bound to the final encapsulated pigment is less than 0.25 grams per gram of pigment as measured by the density gradient centrifugation method.

9. The inkjet ink of claim 1, wherein the polymeric dispersant is selected from the group consisting of acrylic dispersant comprising acrylic and acrylate monomers and polyurethane dispersant and mixtures thereof.

10. The inkjet ink of claim 1, wherein the polymeric dispersant is substituted with crosslinkable moieties where the crosslinkable moieties are selected from the group consisting of acetoacetoxy, acid, amine, epoxy, hydroxyl, blocked isocyanates and mixtures thereof.

11. The inkjet ink of claim 10, wherein the polymeric dispersant substituted with crosslinkable moieties is reacted, after step (a), with a crosslinking agent where the crosslinking agent has functional groups selected from acetoacetoxy, acid, amine, anhydride, epoxy, hydroxyl, isocyanates, blocked isocyanates and mixtures thereof.

12. The inkjet ink of claim 1, wherein the encapsulation monomer is selected from the group consisting of benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, ethoxytriethyleneglycol methacrylate, 2-(2-ethoxyethoxy) ethyl acrylate, hydroxyethyl methacrylate, hydroxypropyl methacrylate, 2-ethoxyethyl methacrylate, hydroxyethyl acrylate, hydroxypropyl acrylate, di- and tri-methacrylates, and mixtures thereof.

13. The inkjet ink of claim 1, wherein the encapsulation monomer further comprises an acrylic hydrophilic monomer that is at most 20 weight percent of the acrylate monomer.

14. The inkjet ink of claim 13, wherein the acrylic hydrophilic monomer is selected from the group consisting of methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

15. The inkjet ink of claim 1, wherein the encapsulation monomer further comprises at least one vinyl monomer which is at most 50 weight percent of the acrylate monomer, said vinyl monomer is selected from the group consisting of styrene, alpha-methyl styrene, substituted styrenes, N-alkyl acrylamides, N-alkyl methacrylamides, vinyl acetate, vinyl butyrate, vinyl benzoate, and mixtures thereof.

16. The inkjet ink of claim 1, wherein the polymeric dispersant is a structured polymeric dispersant selected from the group consisting of block polymer dispersant, branched polymer dispersant, graft star polymer dispersant, and mixtures thereof.

* * * * *